May 24, 1932.  J. SCHECHTER  1,860,160
KEY CUTTING MACHINE
Filed Oct. 19, 1927  2 Sheets-Sheet 2
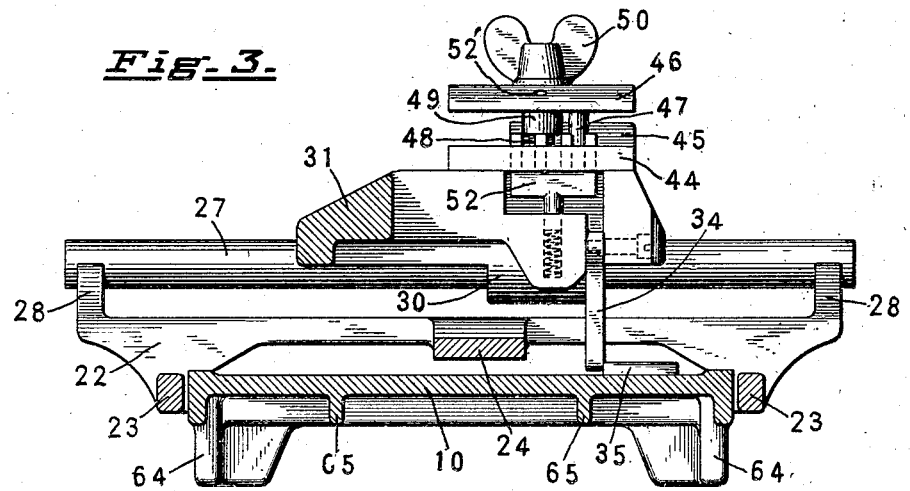
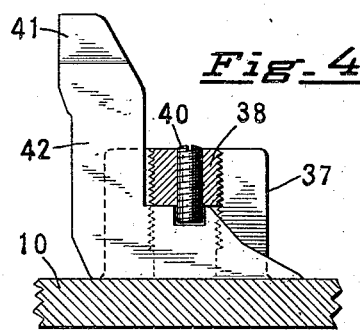
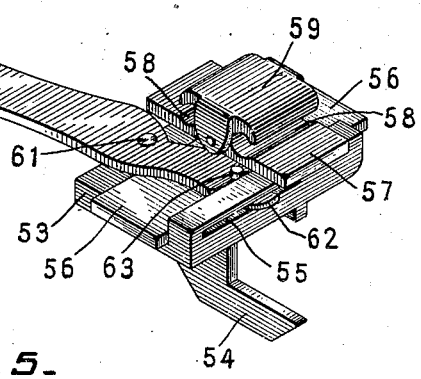
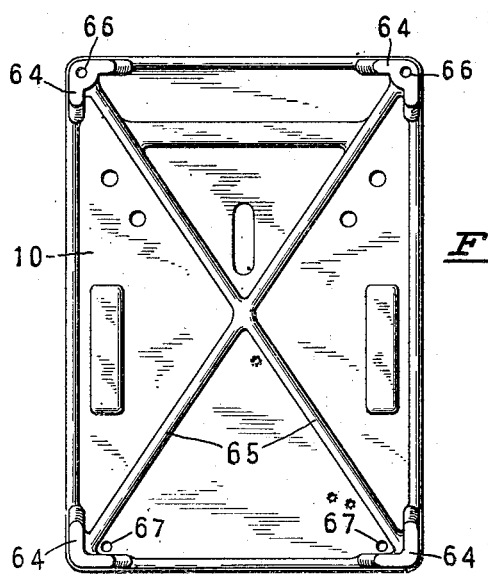
INVENTOR.
Joseph Schechter
BY
Dunn Dunn & Anderson
ATTORNEYS.

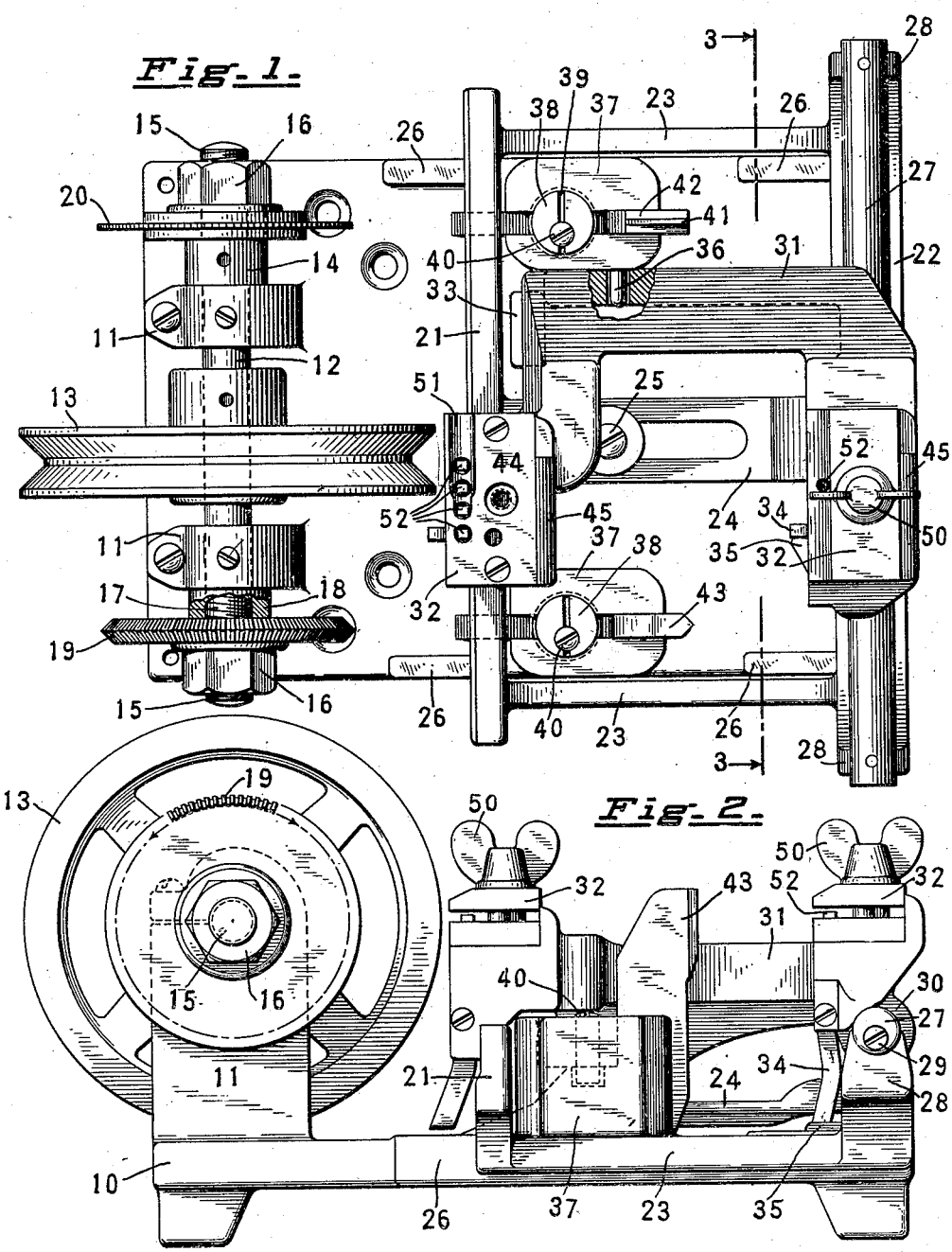

Patented May 24, 1932

1,860,160

UNITED STATES PATENT OFFICE

JOSEPH SCHECHTER, OF BROOKLYN, NEW YORK, ASSIGNOR TO SEGAL LOCK & HARDWARE CO. INC., OF NEW YORK, N. Y., A CORPORATION OF NEW YORK

KEY CUTTING MACHINE

Application filed October 19, 1927. Serial No. 227,070.

This invention relates to an improved key-cutting machine which, preferably, will be so constructed that it may handle with equal facility key blanks of the cylinder, as well as of the old or gate type key.

It is an object of the invention to provide a machine of this type, the parts of which will be relatively few in number and individually rugged in construction and be capable of being assembled with facility to provide a machine operating over long periods of time with freedom from mechanical difficulty, aside from the fact that such machine may be manufactured relatively inexpensively.

A further object of the invention is that of furnishing a machine in which the key blanks will be positioned and retained, while being operated upon, in such manner that work of an imperfect nature will be reduced to a minimum.

Another object is that of furnishing a machine in which the essential parts may be adjusted to compensate for wear, so that the machine may be employed over long periods of time without any renewal of its parts being necessary.

Still another object is that of providing a machine in which the parts, while free to move in response to the desires of the operator, will be prevented from moving to positions, either accidentally or deliberately, at which they are liable to become damaged.

An additional object is that of constructing an attachment which may be employed in conjunction with a key machine for the handling, with facility, of certain operations to be performed in the old or gate type key blank.

With these and further objects in mind reference is had to the attached sheet of drawings which illustrate one practical example of the invention and in which:—

Figure 1 is a plan view of a key-cutting machine embodying one form of the present invention.

Fig. 2 is a side elevation thereof.

Fig. 3 is a sectional view taken along the lines 3—3 in the direction of the arrows of Figure 1.

Fig. 4 is a fragmentary sectional view of one of the key gauges and clamp therefor.

Fig. 5 is a bottom plan view of the machine base and

Fig. 6 is a perspective view of a key holder which is to be employed where keys of the gate type are to be formed.

In these views the numeral 10 indicates the base of the machine which rotatably supports upon spaced standards 11 a shaft 12, the latter carrying a drive pulley 13 of relatively broad area. This shaft has an integral, enlarged collar portion 14 which, as shown, may be formed with an opening for the introduction of a wrench, for a purpose hereinafter brought out, and the opposite ends of this shaft are formed with opposed threads 15, each mounting a nut 16, it being here noted that the left-hand portion of the shaft is further formed with a thread 17 opposed to the adjacent thread 15 and the thread 17 mounting a collar 18.

Clamped between the nut 16 and collar 18 is a bevel cutter 19 and clamped between the second nut 16 and the collar 14 is a saw cutter 20. It is to be noted that, due to the manner in which the threads 15—17 are opposed, that all operating strains will result merely in the cutters being tightened and locked more firmly against movement with respect to the shaft 12. However, if for any reason it becomes necessary to loosen either the nut 16 or the collar 18, this may be achieved readily by simply inserting into the opening of the collar 14 a wrench and thereupon applying to the part to be loosened a suitable wrench in order to accomplish the desired end.

Mounted upon the base for sliding movement with respect thereto is a carriage comprising, in the illustrated embodiment, crossbars 21 and 22 connected by bars 23 extending adjacent the side edges of the base 10, and a further bar 24 substantially intermediate such side edges.

With a view to permitting free sliding movement of the carriage while, at the same time, preventing detachment thereof from the base, a bolt 25 may extend through a slot formed in the bar 24, the head of this bolt or, as shown, washers carried thereby, being sufficiently large to prevent a lifting of the carriage from the base. Portions of the side edges of the base 10 and portions of the top surface thereof are machined, as at 26, the adjacent surfaces of the carriage being likewise treated so that an accurately defined path of travel is provided for the carriage, and the latter may move along the same with utmost freedom, it being understood that, by this construction, it is unnecessary to machine entire surfaces and, as a consequence, useless expense is avoided.

The rear bar of the carriage mounts a rod 27, preferably as shown, by reducing and extending upwardly the ends of the bar 22, as at 28, and forming the ends of the rod with openings through which the upturned ends 28 extend, the parts being secured in position, for example, by means of set screws 29. Encircling the rod or shaft 27 is a collar 30 which mounts an arm 31 extending from the same to a point adjacent the bar 21, clamps, generally indicated at 32, being disposed adjacent the opposite ends of this arm and it being noted that this arm is disposed wholly beyond the side edges of the key clamps 32.

Movement of the carriage away from the cutters is limited by a stop lug 33 extending upwardly from the base 10, which stop is arranged to engage the rear face of the bar 21. This stop likewise serves to prevent the forward movement of the carriage when the parts are in the position shown in Figure 1 in that, in such position, it will engage with the forward lower edge of the arm 31, which is extended downwardly for this purpose, it being finally noted that this same stop lug, incident to engagement with the side edge of the arm, prevents this arm from moving sideways to a point at which the key clamp will engage the side of the pulley, with consequent damage to the parts when this clamp is supporting a blank which is being operated upon by the cutter 19.

The parts are normally locked in the position shown in Figure 1 by having associated with the rearmost clamp a latch, or pivoted lever 34 which, as the arm 30 is shifted sideways, along the bar 21 and rod 27, slides over the outer edge of a wedge-shaped projection 35 extending from the base and falls behind the same. It is obvious that, with the parts in this position, the carriage may not be moved forward incident to engagement between the forward edge of the arm 31 and the rear face of the lug 33, and that the arm and clamps carried thereby may not be moved to the left downwardly, as viewed in Figure 1, incident to engagement between the latch lever 34 and latch lug 35, and that they may not be moved upwardly due to contact between the edge of the arm 31 and the right-hand gauge block hereinafter described, it being furthermore observed, in this connection, that a pin 36 may be carried by this block and a recess formed in the arm 31 to prevent the latter swinging upwardly. Thus, a careless person, in brushing against the machine, cannot cause the parts to be thrown to positions at which they will be damaged, but it is obvious that an operator may deliberately swing the lever 34 outwardly to clear the latch lug 35 so that the arm and clamps carried thereby may be shifted downwardly, as viewed in Figure 1, from which position the forward, or blank clamp 32 may be swung upwardly—carrying with it the arm 31—and these elements may then be shifted along the rod 27 to lie adjacent the cutter 20.

Now referring to the gauge members, it will be noted that, in the machine presently illustrated, blocks 37 extend upwardly from the base of the machine and are formed with a slot disposed to one side of the center line of the block (and, according to standard practice, to the left-hand side of such center line), these slots intersecting a screw threaded orifice, each mounting a screw threaded plug 38, preferably formed with a screw-driver slot 39, whereby they may be turned. Each of these plugs is formed with a screw-threaded bore mounting a set screw 40 of a greater length than the plug 38. As shown in Figure 4, a gauge 41 is mounted, or forms a part of, a plate 42, the body of which extends and rides within the slot of the block 37. The upper edge of the plate 42 is formed with a recess, as shown in Figure 4, for the accommodation of the lower end of the set screw 40. Thus, it is obvious that, with the set screw loosened, as in this figure, the plug may be turned in order to shift forwardly or rearwardly, within the slot of the block 37, the plate which carries the gauge 41. After this member has been set to proper position by the turning of the plug, the set screw is tightened until it bears intimately against the base of the recess within the plate, and under standard screw thread design, it will be understood that, with the parts thus disposed any strains against the gauge or plate in a rearward direction will result merely in the parts tending to engage with greater intimacy and will not result in an accidental shifting. The gauge 43 is likewise mounted within its block 37 and may be similarly adjusted.

Referring to the clamps, heretofore generally indicated at 32, the structure of each of the same is preferably similar. It is to be understood that the rear clamp accommodates the key which is being duplicated and the forward clamp serves, supports and retains the key blank being operated upon. As shown, each of these clamps may include what might be termed a bed plate 44 from the rear edge of which a shoulder 45 extends upwardly and with which bed plate a clamp plate 46 cooperates. This latter plate supports a downwardly extending pin 47 entering a recess formed in the bed plate 44 and also rotatably mounts a screw thread bolt 48 entering a threaded recess in the bed plate, and this bolt presenting a shoulder 49 to be accommodated within the upper end of the bed plate recess, and the bolt being turnable in any desired manner as, for example, by having a winged head 50. In Figure 3 the parts have been shown as extended materially beyond their normal position, but it will be obvious that as the plate 46 moves downwardly to key, or blank clamping position, that the collar 49 will have entered the recess, the pin 47 will also have entered its recess, the shoulder 45 bearing against the rear edge of the plate 46 so that any play between these several parts, and particularly between the blank or key and the clamp, will be prevented when this element is properly engaged between the plates thereof. In order to provide what might be termed a back-stop for the key or blank accommodated within the clamp, the bed plate 44, in the present instance, is formed with a series of aligned openings, the majority of which, as in Figure 1, are disposed preferably in the base of a groove 51. Extending upwardly through these openings are the teeth 52 of a spring-pressed comb member which, in the instance of a cylinder type key, serve as a back-stop to maintain the front edge of the key in the proper plane. The purpose of the groove 51 becomes apparent in that the round or squared shank of an old or gate type key may be accommodated within this groove, it being understood that when such a key or blank therefor is disposed within the clamp the teeth of the comb are retracted as, for example, by projecting a pin or wrench end through an opening 52' in the plate 46, this opening being in line with one of the teeth of the comb. It will furthermore be observed, with reference to this construction, that the last tooth of the comb is in line with the edge of the shoulder 45, as a consequence of which, when it becomes necessary to slot the edge of the key gate, the key may be disposed in perfect alignment with respect to the clamp by simply having its shank bear against the end tooth of the comb and the edge of the shoulder.

In keys of this character it is occasionally necessary to mill a groove in one of the faces of the gate, which heretofore has been an extremely difficult operation. It is proposed, according to the present invention, to employ an attachment for the machine which may take the form shown in Figure 6, in which a grooved plate 53 is provided, with a rearwardly extending tail piece 54 conveniently of hooked shape, one edge of this plate being extended materially and formed with a slot 55. Mounted within the groove of the plate 53 for sliding movement is a plate 56 which may have an extension 57 overlying portions of the upper face of the plate 53 and being formed with parallel grooves 58 on each side of its center. This plate pivotally mounts a clamping member 59 having grooves complementary to the grooves 58 and the entire plate 56 may be shifted within the groove of the plate 53 by the use of a lever 60 pivotally secured to the plate 53, as at 61, and having a slotted nose 62 extending within the slot 55 and embracing a pin 63 secured to the plate 56. Thus, it will be apparent that the entire assemblage of this attachment is maintained by the pivot pin 61, thus reducing materially the cost of manufacture.

As the lever 60 is shifted back and forth any key disposed within either of the grooves 58 is likewise shifted, it being understood that such key is retained in position after disposing it within one of the pair of grooves by forcing a tapered pin or wrench end (not shown) into the second groove. The hook of the attachment is disposed within the forward or blank clamp and, by virtue of having the last tooth of the comb in line with the edge of the shoulder 45 it will be apparent that the attachment and the key blank mounted thereby will be properly disposed with respect to the saw 20.

Finally, with reference to Figure 5, it will be seen that the bed or base of the machine preferably has upon its underside, integral legs 64 and cross ribs 65, thus assuring rigidity of construction and, further, permitting a reduction of weight of the machine. Openings for the passage of clamping bolts or screws may be provided, as at 66, through the forward legs 64 and, as at 67, to one side of the rear legs, it being noted that the forward legs are preferably thickened in order to compensate for any weakness arising incident to providing these openings.

In operation it will be appreciated that, incident to the disposition of the parts it is practicable to employ a drive pulley 13 of relatively broad area. This allows for a slow driving speed of the shaft 12, which is greatly to be desired with a view to efficient key cutting operation. As afore brought out, prior to the rotation of the shaft and incident to the construction of the latter and the mounting thereon of the several cutters these units may, when desired, be dismounted with facility but, under normal conditions of operation, the greater the strain thereon the more they will tend to tighten. The clamps are so mounted that, while they may be shifted to every position which they may be required to assume under proper operation, they cannot be shifted to positions at which damage will occur to the parts. It is obvious, however, that if the carriage is to be dismounted, this may be readily accomplished. It is also apparent that the machining of the parts, allowing for such free shifting of the carriage, is reduced to a minimum by means of the present construction. When it becomes necessary to adjust the gauges—for their initial setting, or incident to wear—this is readily capable of accomplishment, but these gauges will not shift accidentally while the machine is in use. In normal condition the carriage is locked against movement in any direction, but may readily be released from such locked position by simply swinging the lever 34 associated with the rear clamp to clear the latch lug 35, this lever falling automatically to locking position during the shifting of the arm and clamps to the position shown in Figure 1. Obviously, when in unlocked position, the clamps may be shifted with facility to have the blank cooperate with either of the cutters, the key in the rear clamp cooperating with the proper gauge. Incidentally, the key and blank will be properly disposed within the clamps irrespective of whether these elements are of the cylinder or gate types, it being appreciated that in connection with the former type of key, the levers 34, when swung upwardly, may bear against the forward edges thereof in order to assure that both elements are pressed intimately against the teeth of the combs.

It is obvious that the attachment may be applied to the machine with facility and that by means of this attachment keys of the gate type may be readily operated upon.

Thus, among others, the objects specifically afore enumerated are accomplished, but it is to be understood that numerous changes in structure might be resorted to without departing from the spirit of the invention as defined in the following claims.

Having described my invention, what I claim as new and desire to secure by Letters Patent is:—

1. A key cutting machine including a clamp, key-cutting means forming a part of said machine and cooperating with a blank or key disposed within said clamp, said clamp including a bed plate, a second plate, one of said plates being formed with a series of openings, means for relatively moving said plates, a comb, the teeth of which extend through said openings, a spring for projecting such comb and a shoulder forming a part of one of said plates and having its edge in line with one of the teeth of said comb.

2. A key cutting machine including a clamp, key-cutting means forming a part of said machine and cooperating with a blank or key disposed within said clamp and said clamp including a bed plate, a second plate, one of said plates being formed with a series of openings, means for relatively moving said plates, a comb, the teeth of which extend through said opening, and the plate within which such openings are formed being provided with a groove intersected by such openings and which groove is shaped to accommodate the shank of a gauge type key blank.

3. A key cutting machine including a cutter, a key and blank clamp assembly mounted for movement towards and away from said cutter, a gauge disposed adjacent one of the clamps of such assembly, means for adjustably mounting such gauge, including a slotted block within which a continuation of said gauge is disposed, and an eccentric member mounted by said block and cooperating with the extension of the gauge to lock the latter in position.

4. A key cutting machine including a cutter, a key and blank clamp assembly mounted for movement towards and away from said cutter, a gauge disposed adjacent one of the clamps of such assembly, means for adjustably mounting such gauge, including a slotted block within which a continuation of said gauge is disposed, an eccentric member mounted by said block and cooperating with the extension of the gauge, and means for locking such parts against movement under strain.

5. A key machine including a bed, a carriage movable with respect thereto, key cutting and gauge means associated with said bed and cooperating with elements supported by such carriage, and gauge means associated with said carriage and cooperating with the elements supported thereby to check the position thereof, such latter gauge means providing a lock preventing movement of said carriage in one direction upon the latter reaching a predetermined position with respect to the bed.

6. A key cutting machine including a shaft, a cutter mounted upon said shaft, a drive member secured to said shaft, a bed adjacent the same, a carriage movably mounted upon said bed, a clamp supported by said carriage and movable thereon in proximity to said drive member, a lug element and an arm element, one of said elements forming a part of said carriage and another of the same forming a part of said bed, said elements contacting to provide a stop functioning to prevent said clamp, or an element supported thereby, from reaching a position adjacent said drive member.

7. In combination a key cutting machine including a cutter, a key clamp, means for movably mounting the latter with respect to the cutter, means forming a part of said clamp retaining a key blank in predetermined position in respect thereto, a key holding attachment, means for shifting portions of the same to permit of the corresponding manipulation of a key, and means forming a part of said attachment for association with the clamp of the machine and cooperating with the same to be held in the same predetermined position.

In testimony whereof I affix my signature.

JOSEPH SCHECHTER.